United States Patent
Wang (10) Patent No.: US 10,019,892 B1
(45) Date of Patent: Jul. 10, 2018

(54) RISK ASSESSING AND MANAGING SYSTEM AND RELATED METHOD

(71) Applicant: HONGFUJIN PRECISION ELECTRONICS (TIANJIN) CO.,LTD., Tianjin (CN)

(72) Inventor: Shih-Cheng Wang, New Taipei (TW)

(73) Assignee: HONGFUJIN PRECISION ELECTRONICS (TIANJIN) CO., LTD., Tianjin (CN)

(*) Notice: Subject to any disclaimer, the term of this patent is extended or adjusted under 35 U.S.C. 154(b) by 0 days.

(21) Appl. No.: 15/609,122

(22) Filed: May 31, 2017

(30) Foreign Application Priority Data

Apr. 25, 2017 (CN) .......................... 2017 1 0277045

(51) Int. Cl.
*G08B 29/00* (2006.01)
*G08B 29/18* (2006.01)

(52) U.S. Cl.
CPC .................................. *G08B 29/185* (2013.01)

(58) Field of Classification Search
CPC combination set(s) only.
See application file for complete search history.

(56) References Cited

U.S. PATENT DOCUMENTS

| | | | |
|---|---|---|---|
| 6,369,705 B1* | 4/2002 | Kennedy | G01S 5/0027 340/506 |
| 8,928,476 B2* | 1/2015 | Jerhotova | G06F 17/2785 340/3.1 |
| 2016/0163186 A1* | 6/2016 | Davidson | G06Q 50/16 340/506 |

* cited by examiner

*Primary Examiner* — Travis Hunnings
(74) *Attorney, Agent, or Firm* — ScienBiziP, P.C.

(57) ABSTRACT

A risk assessing and managing system for monitoring and managing one or more areas includes an obtaining module, a configuring module, a calculating module, and a managing module. The obtaining module obtains parameters of an area. The configuring module configures a weight coefficient and an evaluation class value to each of several monitoring terminals or sensors according to the parameters and influence proportion of each terminal. The calculating module calculates a weight value of each terminal according to the weight coefficients, and calculates a risk value of the area according to the weight values, the evaluation class values, and readings taken by the monitoring terminals. The managing module determines a risk class of the area according to the risk value and selects an improvement program to manage the area according to the risk class. A risk warning and managing method is also provided.

15 Claims, 5 Drawing Sheets

RISK ASSESSING AND MANAGING SYSTEM AND RELATED METHOD

FIELD

The subject matter herein generally relates to a risk management system and related method.

BACKGROUND

A current risk evaluation method depends upon and requires frequent human intervention to calculate a risk class of an area. Because of the frequent human intervention, the reliability of the calculated result is not optimal.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 1:
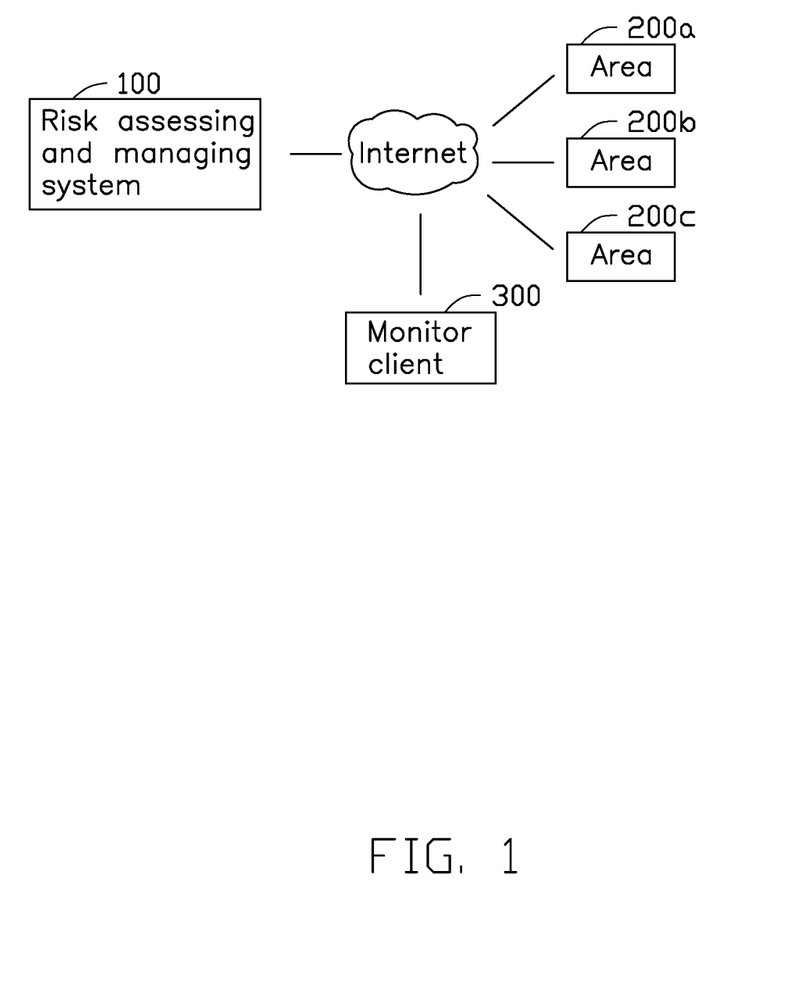
FIG. 1 is an operation environment diagram of an exemplary embodiment of a risk assessing and managing system.

FIG. 1 illustrates a risk assessing and managing system 100 in accordance with an exemplary embodiment.

The risk assessing and managing system 100 monitors a plurality of areas and obtain risk information of the plurality of areas through the internet. The plurality of areas in this exemplary embodiment can comprise three areas 200a, 200b, and 200c. The risk information can be a fire risk, a dust risk, a hazardous material leak risk, and etc. The risk assessing and managing system 100 can transmit the risk information of areas 200a, 200b, and 200c, to a monitor client 300 to inform an administrator.

Figure 2:
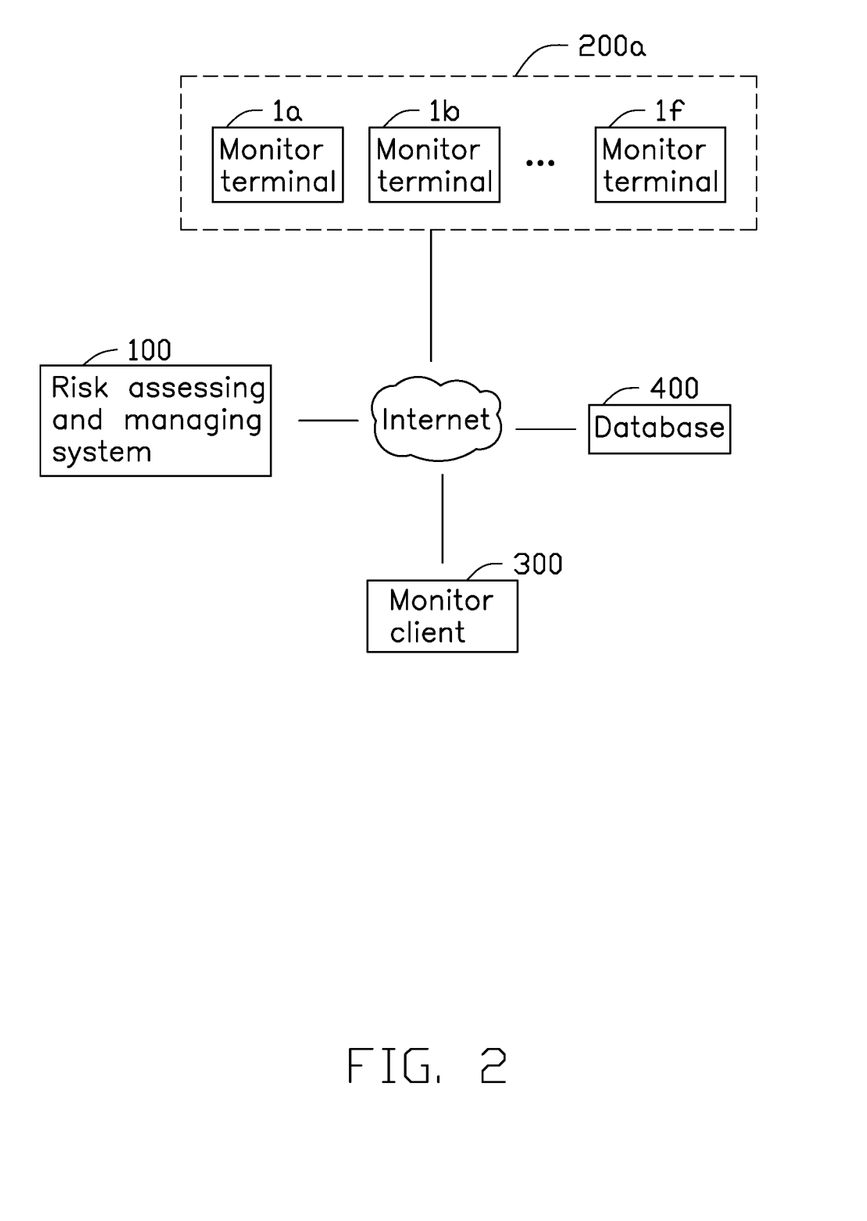
FIG. 2 is a diagram of an exemplary embodiment of the risk assessing and managing system of FIG. 1.

Referring to FIG. 2, the risk assessing and managing system 100 monitors a fire risk of the area 200a for example. The area 200a comprises a plurality of monitor terminals. The plurality of monitor terminals can comprise six monitor terminals 1a through 1f. A database 400 stores a plurality of parameter information of the area 200a.

Figure 3:
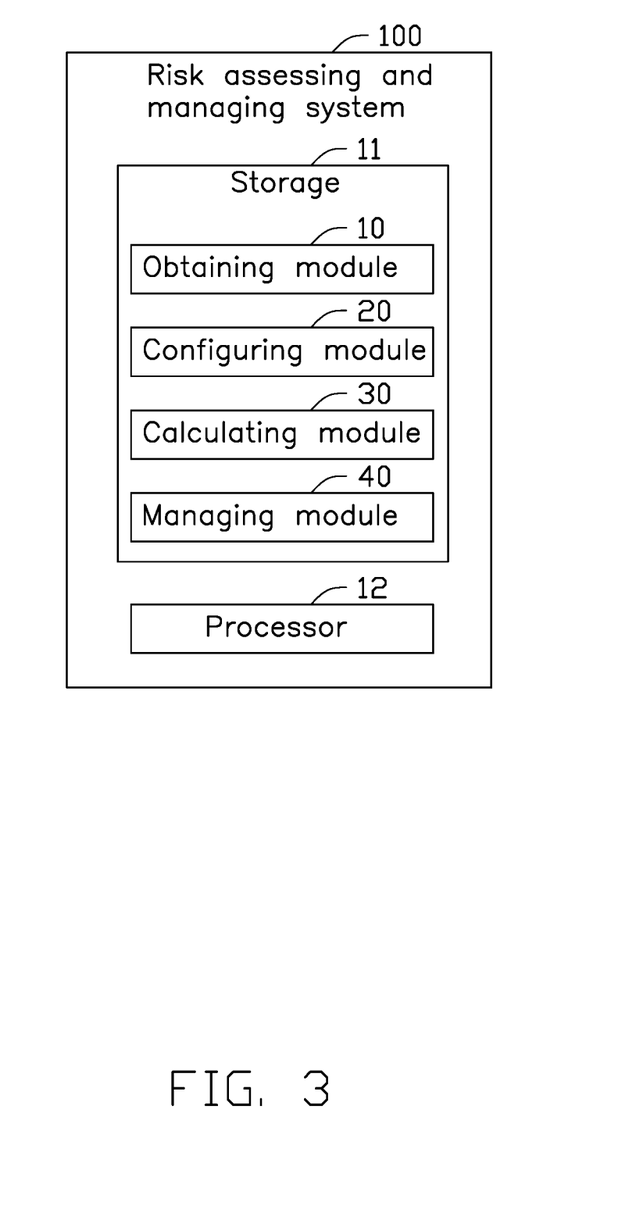
FIG. 3 is a block diagram of an exemplary embodiment of the risk assessing and managing system of FIG. 1.

Referring to FIG. 3, the risk assessing and managing system 100 can comprise at least one storage 11 and at least one processor 12. The risk assessing and managing system 100 can further comprises a plurality of modules, such as an obtaining module 10, a configuring module 20, a calculating module 30, and a managing module 40. The modules 10, 20, 30, and 40 can comprise one or more software programs in the form of computerized codes stored in the storage 11. The computerized codes can include instructions that can be executed by the processor 12 to provide functions for the modules 10 through 40.

The obtaining module 10 obtains the plurality of parameter information of the area 200a.

In one exemplary embodiment, the plurality of parameter information can comprise live inspection information, operation information of the monitor terminals 1a through 1f, and gathered information gathered by the monitor terminals 1a through 1f as instant readings. The obtaining module 10 can communicate with the database 400 to obtain the plurality of parameter information of the area 200a.

In one exemplary embodiment, each of the monitor terminals 1a through 1f, can include a smoke sensor, a temperature sensor, a carbon monoxide sensor, an early fire sensor, a fire equipment, and a fire alarm. The operation information of the monitor terminals 1a through 1f, can comprise information as to normal operation and information as to abnormal operation of the monitor terminals 1a through 1f. The live inspection information can comprise the number of fire extinguishers, operation information of escape lights, escape door information, escape way information, and operation information of emergency lighting equipment.

The configuring module 20 configures a weight coefficient and an evaluation class value applied to each monitor terminal 1a through 1f, according to the live inspection information, the operation information of each monitor terminal 1a through 1f, and an influence proportion of each monitor terminal 1a through 1f.

In one exemplary embodiment, the influence proportion of each monitor terminal 1a through 1f, is defined by causal relationships among each of the monitor terminals 1a through 1f, and severity of consequence of disaster suggested by each of the monitor terminals 1a through 1f.

In an initial state, each monitor terminal 1a through 1f, is configured a predetermined weight coefficient and a predetermined evaluation class value. The configuring module 20 can regulate the predetermined weight coefficient and the predetermined evaluation class value according to the live inspection information and the operation information of each monitor terminal 1a through 1f.

For example, the monitor terminal 1a comprises a plurality of smoke sensors, a weight coefficient of the monitor terminal 1a is 2. When one or more smoke sensors read abnormal operation, the configuring module 20 would increase the weight coefficient of the monitor terminal 1a. The configuring module 20 increases the weight coefficient of the monitor terminal 1a from 2 to 7 for example.

The calculating module 30 calculates a weight value of each monitor terminal 1a through 1f, according to the weight coefficients of the plurality of monitor terminals 1a through 1f. The calculating module 30 further calculates a risk value of the area 200a according to the weight values, the evaluation class values, and the gathered information of the monitor terminals 1a through 1f.

The managing module 40 determines a risk class of the area 200a according to the risk value and selects an improvement program to manage the area 200a according to the risk class.

In one exemplary embodiment, the calculating module 30 can calculate the weight value of each monitor terminal 1a through 1f, through an analytical hierarchy process (AHP) algorithm.

In one exemplary embodiment, the weight value of each monitor terminal 1a through 1f, can be calculated through four steps. In a first step, a hierarchy of fire risk parameters of the area 200a is divided. A first table as below shows fire risk parameters of the area 200a:

TABLE 1

| | first layer parameters | first weight value | second layer parameters | second weight value |
|---|---|---|---|---|
| fire risk of area 200a | operation information of the monitor terminals | | smoke sensor temperature sensor carbon monoxide sensor early fire sensor fire equipment fire alarm | |
| | live inspection information | | fire extinguisher escape light escape door escape way emergency lighting equipment | |

In a second step, the weight coefficients of each monitor terminal 1a through 1f, are configured. A second table as below shows the weight coefficients of each monitor terminal 1a through 1f:

TABLE 2

| monitor terminal | smoke sensor | temperature sensor | carbon monoxide sensor | early fire sensor | fire equipment | fire alarm |
|---|---|---|---|---|---|---|
| smoke sensor | 1 | 2 | 4 | 5 | 7 | 9 |
| temperature sensor | 1/2 | 1 | 3 | 5 | 7 | 9 |
| carbon monoxide sensor | 1/4 | 1/3 | 1 | 3 | 5 | 8 |
| early fire sensor | 1/5 | 1/5 | 1/3 | 1 | 3 | 6 |
| fire equipment | 1/7 | 1/7 | 1/5 | 1/3 | 1 | 3 |
| fire alarm | 1/9 | 1/9 | 1/8 | 1/5 | 1/3 | 1 |

In a third step, weight values of the fire risk parameters are calculated. A third table as below shows the weight values of the fire risk parameters.

TABLE 3

| | first layer parameters | first weight value | second layer parameters | second weight value |
|---|---|---|---|---|
| fire risk of area 200a | operation information of the monitor terminals | 0.7 | smoke sensor | 0.3897 |
| | | | temperature sensor | 0.2887 |
| | | | carbon monoxide sensor | 0.16 |
| | | | early fire sensor | 0.091 |
| | | | fire equipment | 0.045 |
| | | | fire alarm | 0.029 |
| | live inspection information | 0.3 | fire extinguisher | 0.28 |
| | | | escape light | 0.202 |
| | | | escape door | 0.179 |
| | | | escape way | 0.232 |
| | | | emergency lighting equipment | 0.107 |

In the table 3, the first weight value can be regulated by an administrator. The administrator can set the weight value of the live inspection information to 0.2 for example. The weight values of the fire extinguisher, the escape light, the escape door, the escape way, and the emergency lighting equipment can be regulated according to the live inspection information of the area 200a.

In a fourth step, a consistency check of the weight values of the fire risk parameters is performed. If one or more weight values of the fire risk parameters do not meet the consistency check, the risk assessing and managing system 100 outputs an alarm and advises the administrator to revise.

The calculating module 40 further calculates the risk value of the area 200a through a fuzzy synthetic evaluation model if the weight values of each monitor terminal 1a through 1f, meet the consistency check.

In one exemplary embodiment, the risk value of the area 200a can be calculated through five steps. In a first step, the calculating module 40 build an evaluation factor set $U=\{u_1, u_2 \ldots, u_n\}$, where the $u_1, u_2 \ldots, u_n$ can each represent a smoke sensor, a temperature sensor, a carbon monoxide sensor, an early fire sensor, a fire equipment, and/or a fire alarm. In a second step, the calculating module 40 builds a synthetic evaluation set $V=\{v_1, v_2 \ldots, v_n\}$, where the $v_1, v_2 \ldots, v_n$ can each represent an evaluation class value of each of the evaluation factors ($u_1, u_2 \ldots, u_n$).

In a third step, the calculating module 40 generates an evaluation matrix $R=\{r_{i1}, r_{i2} \ldots, r_{im}\}$ according to the evaluation factor set U and the synthetic evaluation set V. The $r_{im}$ can represent the $u_i$ evaluation factor belonging to the $v_m$ level.

In a fourth step, the calculating module 40 calculates a synthetic evaluation matrix $B=A*R=(b_1, b_2 \ldots, b_i)$. The A can represent weight value set of the evaluation factors. According to the table 3, by way of example only, A=(0.3897, 0.2887, 0.16, 0.091, 0.045, 0.029).

In a fifth step, the calculating module 40 calculates a safety class value $H_k$ of the area 200a according to the formula and converts a safety class to the risk class:

$$H_k = \frac{1}{2}[\sum_{i=1}^{k}(b_i(D_{i(max)}-b_i)+\sum_{i=1}^{k}(b_i(D_{i(min)}+b_i)]$$

In one exemplary embodiment, a fourth table as below shows the safety class of the area 200a.

TABLE 4

| safety class | high safety | medium safety | normal safety | normal danger | low danger |
|---|---|---|---|---|---|
| (Di(max)~Di(min)) | 10~8 | 8~6 | 6~4 | 4~2 | 2~0 |

In one exemplary embodiment, a fifth table as below shows the risk class of the area 200a.

TABLE 5

| risk class | highest risk | high risk | medium risk | normal risk | low risk |
|---|---|---|---|---|---|
| (Di(max)~Di(min)) | 10~8 | 8~6 | 6~4 | 4~2 | 2~0 |

If the calculating module 40 calculates the safety class value as $H_k$=7.367, the risk value of the area 200a is 2.363 (i.e., 10−7.637=2.363). According to the table 5, the risk class of the area 200a is a normal risk.

In one exemplary embodiment, the database 400 stores a plurality of improvement programs to manage different risk classes and/or different risk factors. The managing module 40 can communicate with the database 400 to select an improvement program to manage the area 200a to decrease the risk class of the area 200a.

After the managing module 40 manages the area 200a according to the selected improvement program, the configuring module 20 further reconfigures the weight coefficient and the evaluation class value to each monitor terminal 1a through 1f. The calculating module 30 recalculates the risk value of the area according to updated weight values, the updated evaluation class values, and updated gathered information of the monitor terminals 1a through 1f, and the managing module 40 determines to manage the area 200a according to updated risk class.

Figure 4:
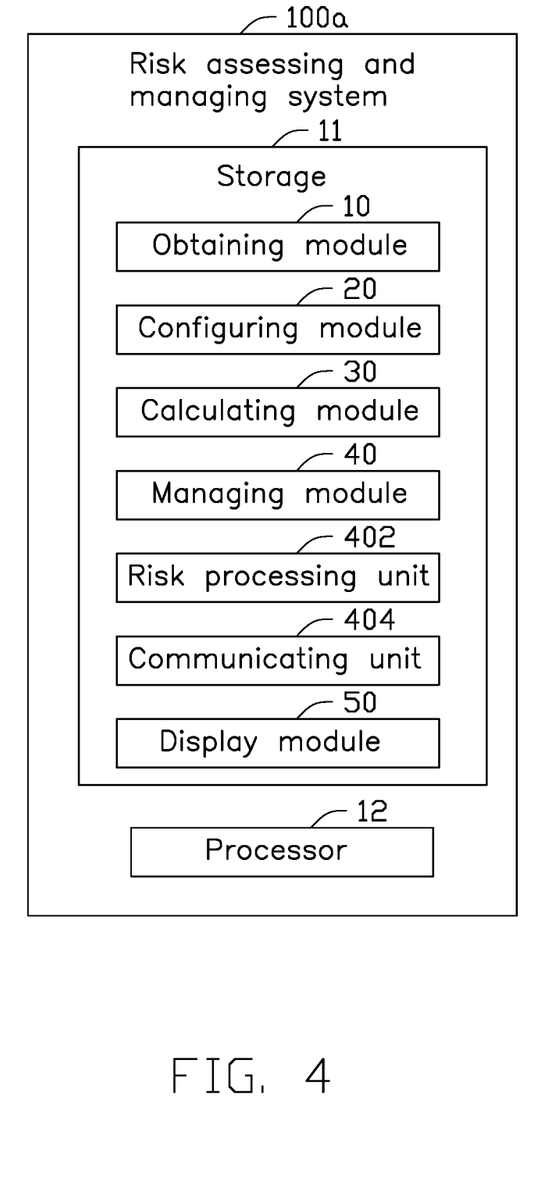
FIG. 4 is a block diagram of another exemplary embodiment of the risk assessing and managing system of FIG. 1.

FIG. 4 illustrates a risk assessing and managing system 100a in accordance with an exemplary embodiment. The managing module 40 comprises a risk processing unit 402 and a communicating unit 404. The risk processing unit 402 determines whether the risk class of the area 200a exceeds a predetermined class. If the risk class of the area 200a exceeds the predetermined class, the risk processing unit 402 analyzes a forming factor of the risk class of the area 200a and selects the improvement program, which corresponds to the forming factor to manage the area 200a. The communicating unit 404 informs the monitor client 300 as to the risk class of the area 200a.

In one exemplary embodiment, the predetermined class can be the normal risk in the table 5.

For example, the risk processing unit 402 determines the risk class of the area 200a to be a medium risk, the forming factor of the area 200a is that an indoor temperature exceeds a predetermined temperature. The risk processing unit 402 can power on an exhaust fan or increase a rotation speed of the exhaust fan to decrease the indoor temperature. When the indoor temperature is less than the predetermined temperature, the risk class of the area 200a is decreased to a normal risk or a low risk. Then, the risk processing unit 402 powers off the exhaust fan or decreases the rotation speed of the exhaust fan.

In one exemplary embodiment, when risk processing unit 402 analyzes the risk class of the area comprising a plurality of forming factors, the risk processing unit 402 sorts the plurality of forming factors according to influence proportion of the plurality forming factors. The areas 200a are then managed according to the priority of each forming factor.

The influence proportion of the plurality forming factors are defined according to severity of consequences of disaster set by the forming factors.

In one exemplary embodiment, the risk assessing and managing system further comprises a display module 50. The area 200a comprises a plurality of buildings, and each building comprises one or more floors. The display module 50 generates a risk guide map and a risk statistical table according to the risk class of the area 200a. The display module 50 can display different risk classes of the plurality of buildings through different colors.

For example, the area 200a is defined to include five risk classes (low risk, normal risk, medium risk, high risk, and highest risk), and the display module 50 can display five risk classes through five different colors. When three risk classes (medium risk, high risk, highest risk) of the area 200a need to be managed, the three risk classes are highlighted on the display module 50.

Figure 5:
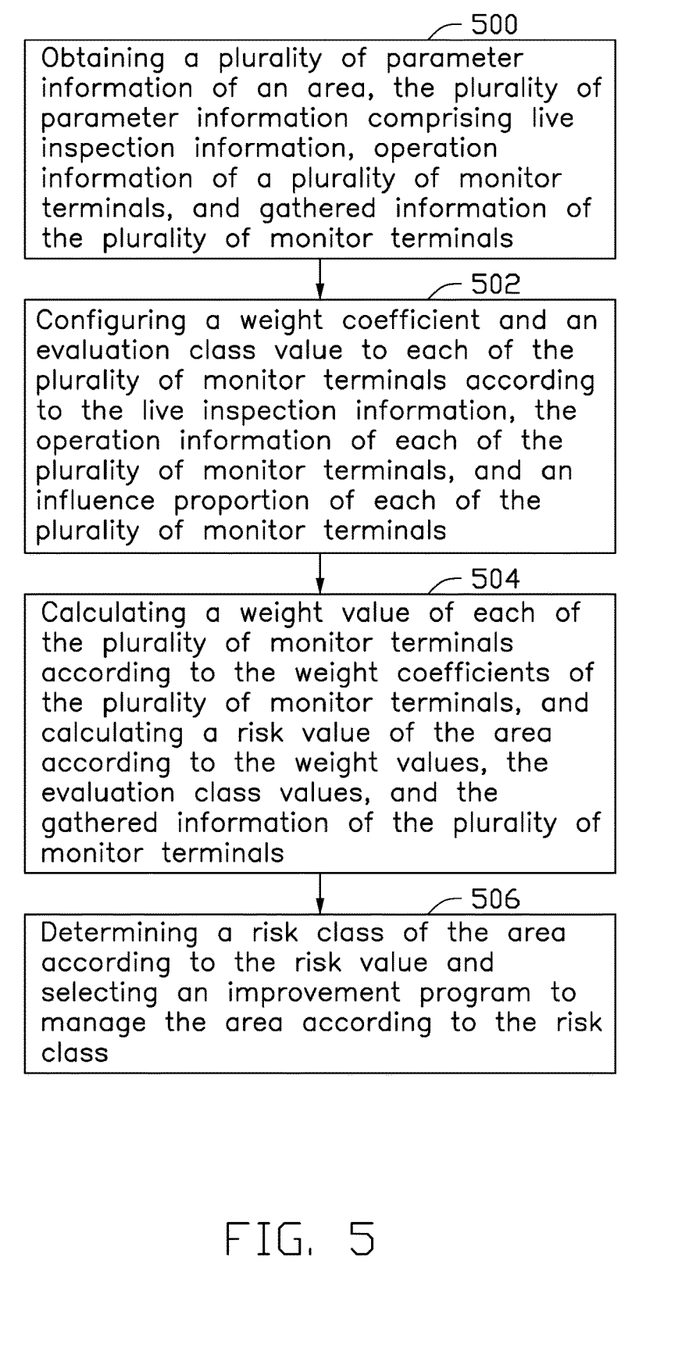
FIG. 5 is a flow diagram of an exemplary embodiment of a risk warning and managing method.

FIG. 5 illustrates one exemplary embodiment of a risk warning and managing method. The flowchart presents an exemplary embodiment of the method. The exemplary method is provided by way of example, as there are a variety of ways to carry out the method. The method described below can be carried out using the configurations illustrated in FIG. 3, for example, and various elements of these figures are referenced in explaining the example method. Each step shown in FIG. 5 represents one or more processes, methods, or subroutines, carried out in the example method. Furthermore, the illustrated order of steps is illustrative only and the order of the steps can change. Additional steps can be added or fewer steps may be utilized, without departing from this disclosure. The example method can begin at step 500.

In step 500, the obtaining module 10 obtains a plurality of parameter information of the area 200a, the plurality of parameter information comprising live inspection information, operation information of the monitor terminals 1a through 1f, and gathered information of the monitor terminals 1a through 1f.

In step 502, the configuring module 20 configures a weight coefficient and an evaluation class value applied to each monitor terminal 1a through 1f, according to the live inspection information, the operation information of each monitor terminal 1a through 1f, and an influence proportion of each monitor terminal 1a through 1f.

In step 504, the calculating module 30 calculates a weight value of each monitor terminal 1a through 1f, according to the weight coefficients of the plurality of monitor terminals 1a through 1f, and further calculates a risk value of the area 200a according to the weight values, the evaluation class values, and the gathered information of the plurality of monitor terminals 1a through 1f.

In step 506, the managing module 40 determines a risk class of the area 200a according to the risk value and selects an improvement program to manage the area 200a according to the risk class.

In one exemplary embodiment, the calculating module 30 further performs a consistency check to the weight value of each monitor terminal 1a through 1f.

In one exemplary embodiment, after the managing module 40 manages the area 200a according to the selected improvement program, the configuring module 20 further reconfigures the weight coefficient and the evaluation class value to each monitor terminal 1a through 1f. The calculating module 30 recalculates the risk value of the area according to updated weight values, updated evaluation class values, and updated gathered information of the monitor terminals 1a through 1f, and the managing module 40 determines to manage the area 200a according to updated risk class.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A risk assessing and managing system comprising:
at least one storage configured to store a plurality of modules, the plurality of modules being a collection of instructions of an application operable in the system;
at least one processor configured to execute the plurality of modules, the plurality of modules comprising:
an obtaining module obtaining a plurality of parameter information of an area, the plurality of parameter information comprising live inspection information, operation information of a plurality of monitor terminals, and gathered information of the plurality of monitor terminals;
a configuring module configuring a weight coefficient and an evaluation class value applied to each of the plurality of monitor terminals according to the live inspection information, the operation information of each monitor terminal, and an influence proportion of each of the plurality of monitor terminals;
a calculating module calculating a weight value of each of the plurality of monitor terminals according to the weight coefficients of the plurality of monitor terminals, and calculating a risk value of the area according to the weight values, the evaluation class values, and the gathered information of the plurality of monitor terminals; and
a managing module calculating a risk class of the area according to the risk value and determining whether the risk class of the area exceeds a predetermined class;
wherein when the risk class of the area exceeds the predetermined class, the managing module analyzes a forming factor of the risk class of the area and select an improvement program that is corresponded to the forming factor to improve the forming factor of the risk class of the area.

2. The risk assessing and managing system of claim 1, wherein the configuring module further reconfigures the weight coefficient and the evaluation class value to each of the plurality of monitor terminals after the managing module manages the area according to the selected improvement program, the calculating module recalculates the risk value of the area according to updated weight values, updated evaluation class values, and updated gathered information of the plurality of monitor terminals, and the managing module determines to manage the area according to an updated risk class.

3. The risk assessing and managing system of claim 1, wherein the calculating module calculates the weight value of each of the plurality of monitor terminals through an analytical hierarchy process (AHP) algorithm and performs a consistency check to the weight value of each monitor terminal, and the calculating module further calculates the risk value of the area through a fuzzy synthetic evaluation model in response to the weight value of each of the plurality of monitor terminals meeting the consistency check.

4. The risk assessing and managing system of claim 3, wherein when one or more weight values of the plurality of monitor terminals do not meet the consistency check, the calculating module outputs an alarm to advise to revise the weight values.

5. The risk assessing and managing system of claim 1, further comprising a display module generating a risk guide map and a risk statistical table according to the risk class of the area, and displaying different risk classes through different colors.

6. The risk assessing and managing system of claim 1, wherein the managing module further informs a monitor client as to the risk class of the area.

7. The risk assessing and managing system of claim 6, wherein when the risk class comprises a plurality of forming factors, the risk processing unit sorts the plurality of forming factors and manages the areas according to the priority of each of the plurality of forming factors.

8. The risk assessing and managing system of claim 1, further comprising a database storing the plurality of parameter information of the area.

9. A risk warning and managing method comprising:
obtaining a plurality of parameter information of an area, the plurality of parameter information comprising live inspection information, operation information of a plurality of monitor terminals, and gathered information of the plurality of monitor terminals;
configuring a weight coefficient and an evaluation class value to each of the plurality of monitor terminals according to the live inspection information, the operation information of each of the plurality of monitor terminals, and an influence proportion of each of the plurality of monitor terminals;
calculating a weight value of each of the plurality of monitor terminals according to the weight coefficients of the plurality of monitor terminals, and calculating a risk value of the area according to the weight values, the evaluation class values, and the gathered information of the plurality of monitor terminals; and
calculating a risk class of the area according to the risk value and determining whether the risk class of the area exceeds a predetermined class, analyzing a forming factor of the risk class of the area, and selecting an improvement program that is corresponded to the forming factor to improve the forming factor of the risk class of the area.

10. The risk warning and managing method of claim 9, further comprising:
reconfiguring the weight coefficient and the evaluation class value to each of the plurality of monitor terminals after managing the area according to the selected improvement program;
recalculating the risk value of the area according to updated weight values, updated evaluation class values, and updated gathered information of the plurality of monitor terminals; and
obtaining an updated risk class of the area according to recalculated risk value and determining to manage the area according to the updated risk class.

11. The risk warning and managing method of claim 9, the step of calculating the weight value of each of the plurality of monitor terminals and calculating the risk value of the area comprises:
    calculating the weight value of each of the plurality of monitor terminals through an AHP algorithm;
    performing a consistency check to the weight value of each of the plurality of monitor terminals;
    calculating the risk value of the area through a fuzzy synthetic evaluation model in response to the weight value of each of the plurality of monitor terminals meeting the consistency check.

12. The risk warning and managing method of claim 11, further comprising:
    outputting alarm to advise to revise the weight values in response to one or more weight values of the plurality of monitor terminals do not meet the consistency check.

13. The risk warning and managing method of claim 9, further comprising:
    generating a risk guide map and a risk statistical table according to the risk class of the area and displaying different risk classes through different colors.

14. The risk warning and managing method of claim 9, further comprising:
    informing a monitor client as to the risk class of the area.

15. The risk warning and managing method of claim 14, wherein when the risk class comprises a plurality of forming factors, the step of determining the risk class of the area according to the risk value and selecting the improvement program to manage the area according to the risk class further comprises:
    sorting the plurality of forming factors and managing the areas according to the priority of each forming factor.

\* \* \* \* \*